Patented Aug. 11, 1942

2,292,824

UNITED STATES PATENT OFFICE 2,292,824

COMPOSITION OF MATTER

Melvin De Groote, University City, and Bernhard Keiser and Charles M. Blair, Jr., Webster Groves, Mo., assignors to Petrolite Corporation, Ltd., Wilmington, Del., a corporation of Delaware No Drawing. Original application May 9, 1938, Serial No. 206,901. Divided and this application July 14, 1939, Serial No. 284,524

7 Claims. (Cl. 260—404)

This invention relates to a new material or composition of matter that is particularly adapted for use in the treatment of emulsions of mineral oil and water, such as petroleum emulsions, for the purpose of separating the oil from the water, our present application being a division of our co-pending application Serial No. 206,901, filed May 9, 1938, now Patent No. 2,176,702, issued October 17, 1939. In addition to being particularly adapted for use as a demulsifier, in the resolution of crude oil emulsions, said new material or composition of matter may have uses in other arts that we have not investigated.

The new material or composition of matter which constitutes the subject matter of our present application, consists of a certain kind of complex amine derived from blown oils and simpler amines; said simpler amines being characterized by the presence of at least one aminohydrogen atom. Said new compound or composition of matter is particularly adapted for use as a demulsifier for crude oil emulsions, either alone, or in admixture with conventional demulsifying agents of a compatible type.

In using said material to break petroleum emulsions of the water-in-oil type, the emulsion is subjected to the action of a demulsifying agent consisting of said material, thereby causing the emulsion to break down and separate into its component parts of oil and water or brine when the emulsion is permitted to remain in a quiescent state, after treatment, or is subjected to other equivalent separatory procedure.

The new material or composition of matter which constitutes our present invention may be in the form of the amine itself, or in the form of the amine base derived by contact with water, or in the form of a salt. Said amine is characterized by the fact that it is derived from a blown oil of the kind hereinafter described in such a manner that the blown oil radical or residue (the oxy-acyl radical) is attached to the nitrogen atom of the amine through a carbon atom chain, which carbon atom chain in turn is alkyl, aralkyl, or alicyclic in nature. Said composition and the method of manufacturing the same will be described subsequently in detail.

It has long been known that various animal, vegetable, and marine oils can be blown or oxidized so as to yield materials which differ in chemical and physical properties and characteristics from the parent materials from which they were derived. The oxidation process is generally conducted by means of moist or dry air, ozone, ozonized air, or a mixture of the same. It may be conducted at atmospheric pressure, or may be conducted under increased pressures of several atmospheres or more. Oxidation may be conducted at relatively low temperatures, for instance, 100° or 130° C. or may be conducted at a much higher temperature. Oxidation may be conducted in absence of catalysts, or in presence of catalysts. Such catalysts may consist of metallic salts, such as cobalt or manganese oleate, or may consist of organic material, such as alpha pinene or the like. Oxidation may be conducted in a relatively short time, such as 20 hours, or may require 200 hours or more.

The blown or oxidized oils are generally selected from unsaturated oils of the non-drying type, or the semi-drying type, including the marine oils, such as marine mammal oils, etc. They are rarely selected from the active drying oils, such as linseed oil and perilla oil. Although glycerides of saturated acids, such as stearin or palmitin, may be oxidized, such blown materials are rarely employed in the various arts. Oxidation of the active drying oils, such as linseed oil or perilla oil, is generally apt to yield a solid or almost solid product, and as a result, demulsifying agents are rarely produced from such materials alone, but may be produced from a mixture of oils containing some proportion of such active drying oils. In actual practice, blown oils of the kind employed in various industries, such as the demulsification of petroleum emulsions, are derived from castor oil, rapeseed oil, cottonseed oil, peanut oil, corn oil, olive oil, and various marine oils, such as sardine, herring, menhaden, and pilchard oil.

When an unsaturated fatty acid or oil, for instance, olive oil, is blown or oxidized with air, hydroxyl groups are formed at the ethylene linkage. This is particularly true if oxidation is carried out with moist air. It is believed that oxygen is first absorbed so as to saturate the ethylene linkage, and that further reaction takes place with water to produce two hydroxyl groups. Whether or not this is the correct explanation, it is known that hydroxyl groups are formed. For instance, "Chemistry of the Oil Industry," by Southcombe, 1926, page 181, in speaking of blown (oxidized) oils, states as follows:

"Hydroxyl groups are unquestionably formed, as the considerable rise in acetyl value proves."

Patents which describe conventional blown oils or conventional methods of making various blown oils for various purposes (including in some instances, for the purpose of demulsifying crude oils), include the following:

U. S. Patent No. 1,929,399, dated October 3, 1933, to Fuchs; U. S. Patent No. 1,969,387, dated August 7, 1934 to Tumbler; U. S. Patent No. 2,023,979, dated December 10, 1935, to Stehr; U. S. Patent No. 2,041,729, dated May 26, 1936, to Seymour; and U. S. Patent No. 1,984,633, dated December 18, 1934, to De Groote and Keiser.

Since the material or composition of matter herein described is derived from blown castor oil, an effort will be made to describe said material or compound in considerable detail. Mild oxidation of castor oil (see "Chemical Technology and Analysis of Oils, Fats and Waxes" by Lewkowitsch, 6th edition, vol. 2, p. 406) produces relatively small modifications in certain important chemical indices, such as the iodine value, the acetyl value, and the saponification value. If drastic oxidation takes place, either by continued mild oxidation from the very beginning of the reaction, as induced by either a higher temperature of reaction, or by the presence of a catalyst, such as alpha pinene, manganese ricinoleate, etc., then one obtains an oxidized oil having characteristics which clearly indicate that drastic oxidation has taken place. These indices of drastic oxidation are a relatively low iodine value, such as 65 or less, and may be as low as 40 or thereabouts; an acetyl value of approximately 160 to 200; an increased viscosity; a specific gravity of almost 1, or even a trifle over 1 at times; and in absence of other coloring matter, a deep orange color.

Drastically oxidized castor oil can be prepared by well known methods, or such products can be purchased on the open market under various trade names, such as "blown castor oil," "bodied castor oil," "blended castor oil," "blended bodied castor oil," "processed castor oil," "oxidized castor oil," "heavy castor oil," "viscous castor oil," etc. These various names appear to be applied to drastically oxidized castor oils which are different in degree but not different in kind.

In preparing the new material or composition of matter, above referred to, not only may the blown oils be derived by direct oxidation of the various fats and oils, but also by direct oxidation of the fatty acids. Blown ricinoleic acid may be derived in the manner indicated in U. S. Patent No. 2,034,941, dated March 24, 1936, to De Groote, Keiser and Wirtel. It should be noted that blown oils in the broad generic sense herein employed include not only the products derived by oxidation, but also the products derived by polymerization. Reference is made to polymerized ricinoleic acid described in U. S. Patent No. 1,901,163, dated March 1, 1933, to Hinrichs. Reference is also made to polymerized castor oil or similar oils of the kind disclosed in application Serial No. 59,090, filed January 13, 1936, by Ivor M. Colbeth, Patent No. 2,114,651, issued April 19, 1938. It might also be desirable to point out that the expression "blown oil," as herein used, contemplates blown unsaturated liquid waxes, such as blown sperm oil. It is understood that in the appended claims the expressions "blown oil" or "blown oil fatty acids" are used in this broad sense to include all the various materials, such as esterified blown fatty acids.

In such instances where blown or polymerized acids are used, it will become apparent that these materials must be converted into an ester before reaction with an amine, as subsequently described. For instance, blown castor oil fatty acids, or polymerized ricinoleic acid can be converted into the ethyl ester, methyl ester, propyl ester, cyclohexyl ester, ethylene glycol ester, glyceryl ester, or any suitable ester by means of conventional esterification processes. We desire specifically to point out that the estolides of blown oils, as described in U. S. Patent No. 2,079,762, dated May 11, 1937, to De Groote and Keiser, are not suitable to be employed in the present process, even after conversion into a completely esterified material by means of a selected alcohol by conventional processes. We have found that when a blown oil is converted into an estolide, such product no longer contains the typical blown oil acidic material. Such estolides are satisfactory demulsifying agents as such, but are not adaptable as raw materials for the manufacture of the amine employed in the present process.

In preparing our new material or composition of matter, we prefer to produce an amine by reaction with a drastically oxidized castor oil having approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxyl value | 188.0 to 220.0 |
| Percent unsaponifiable matter | 1.1 |
| Percent nitrogen | 0.0 |
| Percent $SO_3$ | 0.0 |
| Percent ash | Trace |

Our usual procedure is to eliminate carboxylic acidity of a blown oil by means of a conventional esterification reaction. For instance, in referring to the analysis of the blown castor oil above, it will be seen that such product contains acidity equivalent to 5–10% of the total saponifiable value. Such acidity can be removed by esterification with an alcohol such as methyl alcohol, ethyl alcohol, propyl alcohol, etc. On the other hand, insofar that glycerine is the naturally-occurring alcohol present in most oils and fats, and also insofar that glycerine is non-volatile, it is our preference to add sufficient glycerine to such blown oil and keep it agitated at a temperature of approximately 125–170° C. until carboxylic acidity disappears.

The blown oils, in their various forms, that is, in the ester form, salt form, or acid form, act similarly to fatty acids and their compounds. The typical reactions of fatty acids and amines, particularly primary or secondary amines, may be indicated by the following:

(A) Salt formation  R.COOH+R'NHH→ [HHR'N.H] OOC.R (B) Amide formation  R.COOH+HR'NH→ RCO.NR'H (C) The third type of reaction involves the fatty acid in the form of a salt so as to produce amino fatty acids.

It is to be noted that blown oils can be reacted in such a manner and that the products so obtained are described in U. S. Patent No. 2,077,230, dated April 13, 1937, to De Groote and Keiser.

(D) It has been suggested that certain blown oils contain aldehydic acids. To the extent that aldehydic acids are present, certain amines, particularly primary or secondary amines, can enter into reactions which are characteristic of the aldehyde radical and would have no connection whatsoever with blown oils which do not contain aldehydic acids. It is to be noted that as far as we are aware, the blown oils which we have employed in the manufacture of our improved demulsifying agent are free from any aldehydic acids, and even if aldehydic acids are present, an amine of the kind herein contemplated would not be formed by virtue of reaction with the aldehydic group alone. As to reactions of the type involved in the ammonolysis of aldehydic acids, reference is made to U. S. Patent No. 2,079,764, dated May 11, 1937, to De Groote and Keiser.

(E) Still another type of reaction involves fatty acids and alkylolamines or their functional equivalents, such as hydroxy alicyclic amines. Such reaction in the case of a tertiary alkylolamine, for instance, triethanolamine, may be indicated in the following manner:

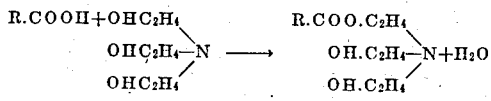

However, it is to be noted that if a blown oil is subjected to hydrolytic reaction, so as to liberate the fatty acids or acid material present, the resultant materials are estolides, rather than the unaltered fatty acids. This has been pointed out in the De Groote, Keiser and Wirtel Patent No. 2,034,941, to which previous reference has been made.

It is manifest that an effort to react liberated blown oil fatty acids with triethanolamine, for example, as indicated above, would not result in derivatives of the fatty acids, as they occur in the blown oil, but rather at the best it would result in derivatives of the estolides. For this reason, materials of the kind which constitutes our present invention cannot be obtained from liberated blown oil fatty acids, but must be obtained from the blown oils themselves. This is comparable to the situation indicated in our co-pending application Serial No. 180,992, filed December 21, 1937, now Patent No. 2,228,985 issued January 14, 1941; in which it is shown that certain amines of a comparable type can be derived from triricinolein, diricinolein, monoricinolein, ethyl ricinoleate, and the like, but cannot be derived from ricinoleic acid, because polyricinoleic acid would be formed.

We have discovered that if blown oils of the kind described are reacted in ester form with primary hydroxy amines, or secondary hydroxy amines, one obtains materials of the kind characterized by the fact that the fatty acid radicals derived from the blown oil are present in the amine compound in an esterified form. Such form is substantially unaltered as compared with the original form as present in the blown oil itself. It may be well to point out two facts in regard to the use of blown oils and the fatty acids derived therefrom. We have previously pointed out that ordinary blown oils show some acidity, and that our present reaction is concerned between hydroxy primary or secondary amines and esters, and not fatty acids. However, since many conventional blown oils contain as little as 5% free acidity, calculated in the usual manner, it is obvious that this small acidity may be ignored and that for practical purposes the preliminary step intended to insure complete esterification may be eliminated.

Secondly, we have referred to the acids present in blown oil as "fatty acids." This is purely a matter of convenience. The expression "fatty acids," as usually employed, is intended to include unsaturated fatty acids of the kind which occur in natural oils and fats in the form of esters, such as the glycerides. These fatty acids are sometimes referred to as higher fatty acids, and occur in oils such as olive oil, cottonseed oil, soy bean oil, corn oil, castor oil, neat's-foot oil, and in marine oils, such a menhaden oil herring oil, sardine oil, pilchard oil, etc.

In some instances, these oils or the corresponding fatty acids, may be heated or oxidized so as to produce lower homologues or higher polymeric forms. For instance, ricinoleic acid can be heated in such a manner as to produce hendecenoic acid, $C_{11}H_{22}O_2$, which is a lower homologue of oleic acid. Such materials are not fatty acids in the usual sense, since they do not occur as such in natural oils and fats, but they are herein considered as fatty acids, since they represent lower homologues or isologues, and have the characteristic properties of the common fatty acids. They occur in blown oils, obtained by well-known procedure. For instance, when castor oil is heated and oxidized so as to produce blown or oxidized oil, one may at least partially break down the molecule having 18 carbon atoms into two molecules having, for example, 7 carbon atoms and 11 carbon atoms. Such acids of lower molecular weight may combine in various manners to produce acids of higher molecular weight than naturally-occurring fatty acids. Hence, the expression "fatty acids" is herein employed to refer not only to naturally-occurring fatty acids of the kind previously described, but also to those kindred products of higher or lower molecular weight which appear cogenerically in conventional blown oils in the form of free acids or esters.

As to the production of the amines somewhat similar to those constituting the new demulsifying agent herein described, attention is directed to our two co-pending applications, Serial No. 180,992 and Serial No. 180,993, both filed December 21, 1937; also to our pending application Serial No. 284,378, filed July 13, 1939 now Patent No. 2,231,754, issued February 11, 1941. In view of the somewhat complicated chemical nature of the demulsifying agents employed, it may be well to point out the general type of reaction involved in their manufacture. For convenience, the fatty acids of blown oils will be considered as R.COOH, and the blown oil itself will be considered as the glyceride of these materials and indicated thus:

$$(R.COO)_3C_3H_5$$

Purely as a matter of simplicity, diethanolamine will be selected as the secondary hydroxyamine for reaction with a selected blown oil. Similarly, ethanolamine will be employed to illustrate the primary amines. The reactions taking place in varying molecular proportions may be indicated in the following manner:

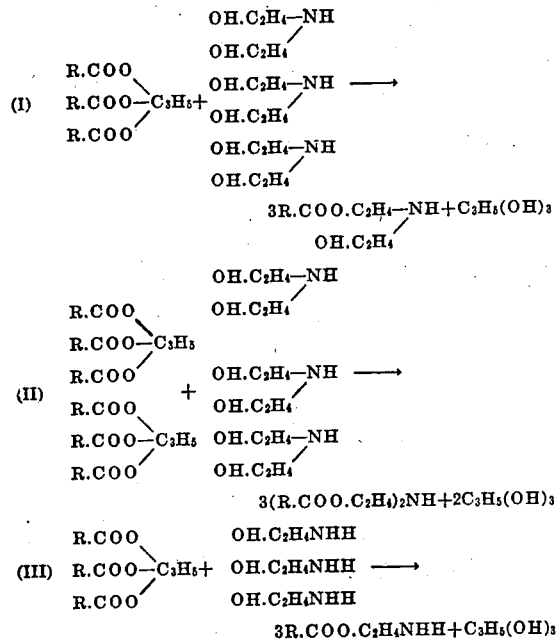

When acid esters derived from acids of relatively low molecular weight, such as acetic acid, oxalic acid, etc. are treated with ammonia or primary or secondary amines, the usual reaction is the formation of amides. The tendency towards amidization decreases with the increase in the length of the carbon chain or the molecular weight of the fatty acid. We have found that perhaps due to the nature of the fatty radical present in blown oils, or perhaps due to the larger molecular weight, or perhaps both reasons, or even for other reasons, that treatment of blown oils with basic non-aryl primary or secondary amines results in the formation, to a large or predominant degree of materials of the esterified form, indicated in the formulas immediately preceding. In a general way, esterification reactions take place at a temperature below the point where amidification takes place. In conducting the reactions, one should select the lowest suitable temperature and conduct the reaction for an extended period of time, rather than employ a high temperature and short period of time. Such conditions make for a maximum esterification and a minimum of amidification.

The manufacture of these compounds is relatively simple. The selected blown oil and the selected hydroxy primary or secondary amine are mixed in suitable proportions and heated at some point above the boiling point of water, for instance, at 110° C., and below the decomposition point of the amine or blown oil, for instance, 180° C., for a suitable period of time, such as 4 to 24 hours. Mild agitation is employed. A catalyst, such as sodium oleate, sodium carbonate, caustic soda, etc., may be present in amounts of about .5% or less. It is to be noted that the blown oils are always in ester form and are not in acid form, thus are not subject to decomposition of the kind which occurs when one attempts directly to react a blown oil fatty acid with a tertiary alkylolamine. It is furthermore to be noted that this reaction does not take place to any appreciable extent, if the blown oil has been converted into a soap or salt. It is obvious that the blown oil fatty acids must be in the form of an ester, preferably a glyceryl ester, although some other esterified form, for instance, a derivative of a monohydric or dihydric alcohol, could be employed.

Four additional facts must be borne in mind in regard to those compounds. In the first place, these amines which are employed as demulsifying agents in the present process are not quaternary ammonium bases or salts thereof. The expression "quaternary ammonium" is properly and conventionally applied to compounds in which all four hydrogen atoms of the ammonium radical $NH_4$ have been replaced by a hydrocarbon radical or oxy-hydrocarbon radical, as, for example, in trimethyl phenyl ammonium hydroxide.

Secondly, an important characteristic which must be recognized is that these amine compounds are not amides. It has been previously pointed out that an amide formation involves a product in which there is a direct linkage between the carboxylic carbon atom and the nitrogen atom in the amine. This is not the case in the compounds herein described.

In the third place, it must be recognized that these compounds are derived only from basic amines. The word "basic" is employed to exclude amines having little or no basicity such as the ordinary aromatic amines, or any amine having at least one aryl radical directly joined to the amino nitrogen atom. For this reason, these amine products which are herein contemplated as demulsifying agents and which necessarily are characterized by freedom from any aryl groups as such, cannot be derived from aryl amines. They are derived solely from alkyl, alicyclic, or aralkyl amines having at least one hydroxyl group present. It is true that in the aralkyl amines there is an aryl group present, but it is not directly attached to the nitrogen atom, as in the case of aryl amines, but in fact, represents nothing more or less than a substituted alkylamine. For instance, we consider benzylamine as being the primary amine, phenmethyl amine.

Finally, it must be recognized that these materials have not lost any basicity in the forms of the esterified amine, and that they exhibit all the properties of a basic amine, that is, they combine with water to form a base, presumably a substituted ammonium compound, but not a quaternary ammonium compound insofar that there are always two or three unsubstituted hydrogen atoms of the ammonium radical present. They combine with various acids to form salts. For example, they may be combined with acetic acid, hydrochloric acid, lactic acid, chloracetic acid, nitric acid, butyric acid, phosphoric acid, oxalic acid, or any suitable organic or inorganic acid, to form salts. It is understood that the reference in the specification and appended claims to the amines includes the basic form and the acid salts, as well as the amines themselves. The characteristic demulsifying properties are contributed by the amine, and it is immaterial whether they may be considered as being in any one of the following forms:

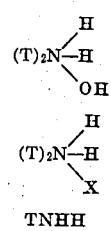

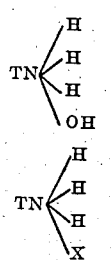

in which T represents the substituents of the amino hydrogen radicals of the parent ammonia from which all amines are hypothetically derived, and X simply represents the acid radical of any acid employed.

In referring to the amines derived by reactions involving blown oils and hydroxy primary or hydroxy secondary amines, it is to be noted that the products may be characterized by the following formulas:

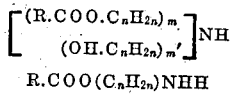

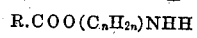

in which $m$ is one or two and $m'$ is zero or one, with the proviso that $m+m'=2$; and $n$ denotes any small whole number, preferably less than 10, and in the case of diethanolamine, denotes the number 2. In the above formulas and in all subsequent formulas, including those appearing in the appended claims, R.COO represents the blown oil fatty acid radical, which, as has been previously explained, is in reality a collection or mixture of organic acids which appear cogenerically in the manufacture of blown oils.

If, instead of employing diethanolamine, ethyl ethanolamine, or a similar amine were employed, then the resulting products would be indicated by the following formula:

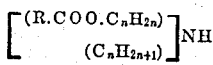

in which R.COO has the same significance as previously.

It is also possible to obtain compounds such as a mono-acetylated diethanolamine, in which the acetyl radical has replaced one hydrogen atom of one of the hydroxy ethyl radicals. Acetic acid in this instance may be considered typical of the lower fatty acids, which have less than 7 carbon atoms. If such monoacetylated diethanolamine were employed, the reaction product would be indicated by the following type formula:

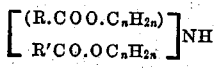

In this formula R′CO indicates an acyl radical derived from a lower molecular weight fatty acid having less than 7 carbon atoms. Attention is directed to the fact that the divalent aliphatic radical indicated by $C_nH_{2n}$ may be a radical such as a $C_2H_4$ radical, $C_3H_6$ radical, $C_4H_8$ radical, $C_5H_{10}$ radical, or it may be an alicyclic radical, or an aralkyl radical, as will become obvious from the kind of amines subsequently enumerated. Furthermore, where the radical $C_nH_{2n+1}$, which is a typical alkyl radical, appears it may be a methyl radical, ethyl radical, propyl radical, butyl radical, amyl radical, hexyl radical, octyl radical, etc.

On the other hand, instead of being a monovalent alkyl radical, it may be a monovalent alicyclic radical, such as a cyclohexyl radical, or it may be an aralkyl radical, such as a benzyl radical. In the claims appended hereto, it is understood that the expression "alkylol" includes the hydroxy hydrocarbon radicals, whether derived from alkyl, alicyclic, or aralkyl radicals. It is furthermore understood in the hereto apended claims that the expression hydroxy alkyl includes hydroxy alicyclic, as well as hydroxy aralkyl radicals, provided that in the latter the hydroxyl group is attached to the aliphatic side chain. Attention is also directed to the fact that the primary or secondary amines involving the dihydroxy propyl radical

may substitute for the hydroxy alkyl radicals of the kind described. It is also understood that alkyl-oxy-alkyl radicals are the equivalent of an ordinary alkyl radical, insofar that they might appear in products such as the dihydroxy ethyl ether of diethanolamine, which may be indicated by the following formula:

Such material would be the obvious functional equivalent of diethanolamine in reactions of the kind contemplated in the manufacture of the demulsifying agents herein described. The amine herein described might be indicated by the following formula:

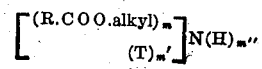

in which $m$ is 1 or 2, $m'$ is 0 or 1, and $m''$ is 1 or 2, with the proviso that $m+m'+m''=3$; T is an alkyl radical or a radical of the type (R′COO alkyl) or a hydroxy alkyl radical; and R′.COO represents an acid radical having less than 7 carbon asoms. The expression "alkyl" is used in the broad sense previously specified, and it is also repeated that the amine may be used in the form of the base or in the form of a salt.

Suitable bases which may be reacted with blown oils or completely esterified blown oils or esterified blown oil fatty acids to produce the reagents herein described include diethanolamine, monoethanolamine, ethyl ethanolamine, methyl ethanolamine, propanolamine, dipropanolamine, propyl propanolamine, monoglycerylamine, diglycerylamine, monoglycerylamylamine, etc. Other examples include cyclohexyl ethanolamine, cyclohexyl propanolamine, benzylethanolamine, pentanolamine, hexanolamine, octylethanolamine, octadecylethanolamine, cyclohexanolamine, dicyclohexanolamine, etc.

In indicating the various hydroxylated primary or secondary amines of the non-aryl type which may be employed to produce the amine constituting our improved demusifying agent, it is desirable to indicate that amines of the type where a hydroxy acyl radical replaces a hydrogen atom of the hydroxy primary or secondary amine, are not included within the broad class of hydroxy tertiary amines, unless there is another hydroxyl radical attached to the usual alkyl radical. For instance, if ethanolamine is treated with lactic acid, so as to form the lactyl derivative of the following formula:

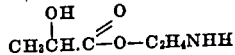

then it is understood that such materials would not represent a hydroxy primary amine within the meaning or scope, as herein employed. The same would be true if the corresponding product derived from diethanolamine, provided that both hydroxy radicals had been esterfied with lactic acid. If, on the other hand, diethanolamine were treated with lactic acid, so as to give monolactyl diethanolamine of the following composition:

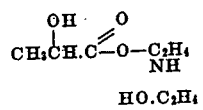

then such compound would be included, due to the presence of the hydroxyl radicals attached to the alkyl radicals.

Example I

Blown castor oil of the kind previously described in detail is employed. For the sake of convenience, its molecular weight is considered as being 1000. Commercial diethanolamine and blown castor oil in the proportion of one mol of blown castor oil to 3 mols of diethanolamine are heated to a temperature between 120° and 140° C. for about 2 hours. Mild agitation is employed. Loss of basicity is an indication of amidification. Time of reaction may be extended or temperatures lowered or raised so as to insure maximum esterification. The reaction product so produced may be used as such, or may be converted into the acetate by the addition of the maximum amount of glacial acetic acid, which can be added without causing acidity to methyl orange indicator. Generally speaking, this will require about 2¼ mols of glacial acetic acid or slightly less.

Example II

Ethanolamine is substituted for diethanolamine in Example I.

Example III

Ethyl ethanolamine is substituted for diethanolamine in Example I.

Example IV

Cyclohexylamine is reacted with glycerol monochlorhydrin to give monoglyceryl cyclohexylamine. This product is substituted for diethanolamine in Example I.

Example V

Glycerylamine is substituted for diethanolamine in Example I.

Example VI

Diglycerylamine is substituted for diethanolamine in Example I.

Example VII

Benzylamine is reacted with glyceryl monochlorhydrin to produce monoglyceryl benzylamine. This product is substituted for diethanolamine in Example I.

Example VIII

An ester amine of the following composition:

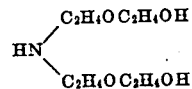

is substituted for diethanolamine in Example I.

Example IX

Blown rapeseed oil of commerce, molecular weight figured as 990, is substituted for blown castor oil and employed in Examples I—VIII, inclusive.

Example X

Blown cottonseed oil, molecular weight figured as 980, is substituted for blown castor oil in Examples I–VIII, inclusive.

We desire to emphasize that the products obtained in the above examples may be used in the form of the amine by direct contact with an emulsion without contact with water. They may be contacted with water, that is, used in the form of a solution, so as to produce in a greater or lesser degree the amine base. Furthermore, any of the products above described may be combined with suitable acid. Acetic acid may be employed. Hydrochloric acid is particularly desirable. In some instances, acids, such as oleic acid or naphthenic acid, may be employed to give a suitable salt.

In examining the method of manufacture of these compounds, as previously illustrated, it is apparent that certain by-products appear, such as glycerine, mono- or diglycerides, etc. From a practical standpoint it is unnecessary to separate these cogeneric materials, though it would be possible to do so by conventional processes. It is quite possible that these materials which appear as a part of the reaction mass contribute to a greater or lesser degree to the demulsifying power of the amine body. It may be that some of these materials which appear in the reaction mass cannot be completely identified as to their form. For instance, it is at once possible to see that condensation products might be formed under proper conditions between amines of the kind herein described and either glycerol, ethanolamine, diethanolamine, or the like, by virtue of an ether linkage. In view of this fact, in the appended claims our new material or composition of matter will not only be described in terms of the chemical structure of the amine, but also in terms of the method of manufacture. The purpose of the claims which are characterized by reference to the method of manufacture is specifically to include the general reaction mass produced in the manufacture of the amine bodies.

One should not lose sight of the fact, however, that the present invention is concerned particularly with the employment of certain chemical compounds of definitely stated composition which are present in significant or predominant amounts in the mixtures obtained by the reactions described. Needless to say, the employment of the selected demulsifying agents in the art of breaking crude oil emulsions is not limited to any particular method of manufacture, except in the appended claims, in which specific reference is made to manufacturing procedure.

Attention is directed to the fact that the word "amidification" has been applied to the reaction involving the replacement of an amino hydrogen atom by an acyl radical, without conventional limitation to a reaction involving ammonia The replacement of the amino hydrogen atom of a primary amine or a secondary amine by an acyl radical has been considered as being amidification, rather than the formation of a substituted amide, or the formation of an imide or substituted imide. Such obvious departure from conventional nomenclature has been for purposes of simplicity and to show the similarity between certain reactions.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the demulsifying material or materials herein described may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or even 1 to 30,000, such an apparent solubility in oil and water is not significant, because said reagents undoubtedly have solubility within the concentration employed. This same fact is true in regard to the demulsifying material or materials herein described.

We desire to point out that the superiority of the reagent or demulsifying agent herein described is based upon the ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents herefore available.

In using our improved demulsifying agent to resolve a petroleum emulsion the said agent is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

Having thus described our invention, what we claim as new and desire to secure by Letters Patent is:

1. A new composition of matter derived by reaction, under substantially anhydrous conditions, between a blown oil and a hydroxyamine having at least one amino hydrogen atom and at least one hydroxyl group aliphatically bound to the amino nitrogen and free from amino nitrogen linked aryl radicals, within the molal ratio of 1:1 and 1:3, at a temperature above the boiling point of water and below the point of decomposition; said reaction being conducted in a manner to yield a substantial quantity of basic material in which the blown oil fatty acid radical is attached to the basic nitrogen atom through a carbon chain by replacement of the hydrogen of at least one hydroxyl of the hydroxy amine by the acyl group of the blown oil fatty acid radical, with the added proviso that the ratio of said acid radical to amino nitrogen atom shall be at least 1:1 and not more than 2:1; said basic material being further characterized by absence of amide and polyamino radicals.

2. A new composition of matter derived by reaction, under substantially anhydrous conditions, between a blown oil and diethanolamine within the molal ratio of 1:1 and 1:3, at a temperature above the boiling point of water and below the point of decomposition, said reaction being conducted in a manner to yield a substantial quantity of basic material in which the blown oil fatty acid radical is attached to the basic nitrogen atom through a carbon chain by replacement of the hydrogen of at least one hydroxyl of the hydroxy amine by the acyl group of the blown oil fatty acid radical, with the added proviso that the ratio of said acid radical to amino nitrogen atom shall be at least 1:1 and not more than 2:1; said basic material being further characterized by absence of amide and polyamino radicals.

3. A new composition of matter derived by reaction, under substantially anhydrous conditions, between a blown castor oil and diethanolamine within the molal ratio of 1:1 and 1:3, at a temperature above the boiling point of water and below the point of decomposition, said reaction being conducted in a manner to yield a substantial quantity of basic material in which the blown oil fatty acid radical is attached to the basic nitrogen atom through a carbon chain by replacement of the hydrogen of at least one hydroxyl of the hydroxy amine by the acyl group of the blown oil fatty acid radical, with the added proviso that the ratio of said acid radical to amino nitrogen atom shall be at least 1:1 and not more than 2:1; said basic material being further characterized by absence of amide and polyamino radicals.

4. A new composition of matter, comprising a chemical compound of the type indicated by the formula:

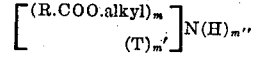

in which $m$ is 1 or 2, $m'$ is 0 or 1, and $m''$ is 1 or 2, with the proviso that $m+m'+m''=3$; R.COO is a blown oil fatty acid radical, T is selected from the class consisting of alkyl radical, radicals of the type (R'.COO.alkyl) and hydroxy alkyl radicals; and R'.COO represents an acid radical having less than 7 carbon atoms.

5. A new composition of matter, comprising a chemical compound of the type indicated by the formula:

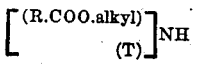

in which T is a hydroxy alkyl radical and R.COO is a blown oil fatty acid.

6. A new composition of matter, comprising a chemical compound of the type indicated by the formula:

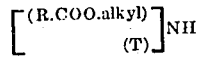

in which T is a hydroxy ethyl radical and R.COO is a blown oil fatty acid radical.

7. A new composition of matter, comprising a chemical compound of the type indicated by the formula:

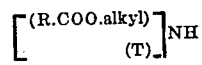

in which T is a hydroxy ethyl radical and R.COO is a blown oil fatty acid radical derived from castor oil.

MELVIN DE GROOTE.
BERNHARD KEISER.
CHARLES M. BLAIR, Jr.